United States Patent [19]
Rombola et al.

[11] Patent Number: 5,689,588
[45] Date of Patent: Nov. 18, 1997

[54] METHOD AND APPARATUS FOR INCREASING COMPRESSIBILITY OF MULTIBIT IMAGE DATA WITH THE LSB VALUE DETERMINED IN THE THRESHOLDING OPERATION BASED ON PIXEL POSITION

[75] Inventors: Gregory Rombola, Spencerport; Hwai-Tzuu Tai; Thomas Joseph Wetzel, both of Rochester, all of N.Y.

[73] Assignee: Eastman Kodak Company, Rochester, N.Y.

[21] Appl. No.: 582,319

[22] Filed: Jan. 3, 1996

[51] Int. Cl.⁶ .......... H04N 1/405; H04N 1/41; G06T 5/00; G06T 9/00
[52] U.S. Cl. .......... 382/237; 382/252; 382/270; 358/429; 358/456; 358/466
[58] Field of Search .......... 382/237, 270, 382/252, 251; 358/429, 456, 465, 466, 457, 458, 460, 455, 534, 535, 443

[56] References Cited

U.S. PATENT DOCUMENTS

| | | |
|---|---|---|
| 4,891,710 | 1/1990 | Nakazato et al. .......... 358/443 |
| 5,172,247 | 12/1992 | Ghaderi .......... 358/456 |
| 5,384,646 | 1/1995 | Godshalk et al. .......... 358/443 |
| 5,394,250 | 2/1995 | Shono .......... 358/455 |
| 5,436,736 | 7/1995 | Shono .......... 358/456 |
| 5,446,561 | 8/1995 | Tai et al. .......... 358/457 |
| 5,495,346 | 2/1996 | Choi et al. .......... 358/457 |

*Primary Examiner*—Scott A. Rogers
*Attorney, Agent, or Firm*—Norman Rushefsky

[57] ABSTRACT

A method and apparatus for processing image data of pixels to be rendered for efficient storage in a memory or efficient transmission wherein a grey level value of a rendered pixel is represented by multiple bits including a most significant bit (MSB) and a least significant bit (LSB). The method and apparatus provide for modifying of the density values of successive pixels in accordance with an error diffusion operation. The modified density values are then subject to a thresholding operation wherein the thresholding operation employs position of a pixel to determine the digital value of the LSB of the rendered pixel. There is thereby provided a pattern structure to the LSB data. The rendered pixel values may then be compressed to provide for efficient storage in a memory or for efficient transmission over a communication pathway. The invention thus relates to improving the compressibility of the total image data by imparting structure to at least rendered image data where the error diffusion process would normally remove any structure to the LSB's of the image.

15 Claims, 9 Drawing Sheets

| A | B | C |
|---|---|---|
| MODIFIED 8 BIT-DENSITY VALUES | ERROR ARRAY | 4-BIT RENDERED PIXEL VALUES (0-15) |
| 0-15 | 0 | 0 |
| 16-31 | 24 | 1 |
| 32-47 | 40 | 2 |
| 48-63 | 56 | 3 |
| 64-79 | 72 | 4 |
| 80-95 | 88 | 5 |
| 96-111 | 104 | 6 |
| 112-127 | 120 | 7 |
| 128-143 | 136 | 8 |
| 144-159 | 152 | 9 |
| 160-175 | 168 | 10 |
| 176-191 | 184 | 11 |
| 192-207 | 200 | 12 |
| 208-223 | 216 | 13 |
| 224-239 | 232 | 14 |
| 240-255 | 255 | 15 |

FIG. 2

NEW PIXEL VALUE=
PIXEL$_X$ +ERROR$_A$ +ERROR$_B$ +ERROR$_C$ + ERROR$_D$ +ERROR$_G$

| A | B | C |
|---|---|---|
| MODIFIED 8 BIT-DENSITY VALUES | ERROR ARRAY | 4-BIT RENDERED PIXEL VALUES (0-15) |
| 0-15 | 0 | 0-(0000) |
| 16-47 | 24 | 1-(0001) |
| 48-79 | 56 | 3-(0011) |
| 80-111 | 88 | 5-(0101) |
| 112-143 | 120 | 7-(0111) |
| 144-175 | 136 | 9-(1001) |
| 176-207 | 184 | 11-(1011) |
| 208-239 | 216 | 13-(1101) |
| 240-255 | 255 | 15-(1111) |

FIG. 4a

| A | B | C |
|---|---|---|
| MODIFIED 8 BIT-DENSITY VALUES | ERROR ARRAY | 4-BIT RENDERED PIXEL VALUES (0-15) |
| 0-15 | 0 | 0-(0000) |
| 16-47 | 40 | 2-(0010) |
| 48-79 | 72 | 4-(0100) |
| 80-111 | 104 | 6-(0110) |
| 112-143 | 136 | 8-(1000) |
| 144-175 | 184 | 10-(1010) |
| 176-207 | 200 | 12-(1100) |
| 208-239 | 232 | 14-(1110) |
| 240-255 | 255 | 15-(1111) |

FIG. 4b

METHOD AND APPARATUS FOR INCREASING COMPRESSIBILITY OF MULTIBIT IMAGE DATA WITH THE LSB VALUE DETERMINED IN THE THRESHOLDING OPERATION BASED ON PIXEL POSITION

FIELD OF THE INVENTION

The present invention relates to apparatus and methods for processing of grey level image data for efficient storage in a memory or for efficient transmission of the data.

DESCRIPTION RELATIVE TO THE PRIOR ART

In the prior art it is known to use non-impact recording apparatus that employ laser, LED, thermal, ink-jet or other recording sources for respectively recording images on an appropriate medium by forming picture elements (pixels) of varying grey shades. Typically, the recording apparatus includes image processing means for generating a multibit image digital signal (MIDS) for each pixel to be recorded. In response to each MIDS, a pixel of a corresponding size or density is recorded on the medium and a number of pixels in the aggregate comprise a recording image that may be viewed or transferred to another medium for viewing. The recording apparatus may form a part of a copier wherein a multipage document to be copied includes an image scanner to transform the images on the document to electrical signals representative thereof. If multiple copies of the document are to be made and printed in collated order without more than one scan of each page of the original, it may be necessary for the copier to store the image data for all of the pages of the document. Where the stored data is more than one bit per pixel, such storage requirements may be excessive because of limited available memory.

In U.S. Pat. No. 5,384,646, there is described an apparatus wherein the multibit image data is separated into separate bit planes for storage. For example, where the MIDS is a two-bit signal the least significant bit (LSB) and the most significant bit (MSB) portions of the signals are separated and separately compressed, stored and then expanded. Eventually, the separate bits are brought together for use in printing and defining a grey level of a pixel to be recorded.

A problem with the above is that in rendering certain images, improved results can be obtained using a rendering technique involving error diffusion. The concept of error diffusion results from the recognition that quantization errors are introduced in a thresholding rendering operation and that these errors may be corrected by distributing errors introduced in rendering prior pixels to a current pixel being rendered. Error diffusion images by their very nature have minimal, if any, structure. As a consequence, error diffused image data (in general) do not compress very well. The LSB plane of a multibit error diffused image tends to compress very poorly. Known compression encoding schemes or algorithms operate well upon data that have detectable structure. The schemes such as Q-coder and Lempel Ziv adapt compression to the underlying structure in the data signal. They do this in different ways. Q-coder is a known implementation of arithmetic coding. With arithmetic coding, the entire sequence of input symbols (i.e., pixels) are mapped to a single code word (albeit a very long code word) This code word is developed by recursive interval partitioning using the symbol probabilities. The final code word represents a binary fraction that points to the sub-interval determined by the sequence. The Q-coder is a binary compression scheme which utilizes an adaptive probability estimator to predict the probability of an input symbol (pixel). Compression is significantly improved if the predicted probability is skewed toward 0 or 1. Therefore, the introduction of predictable structure results in higher compression. One method of utilizing the Q-coder is bit plane encoding in which the algorithm may operate upon strings of MSB's, for example, the strings of other bit planes and then strings of LSB's.

Lempel Ziv is also an adaptive program but creates a dictionary of code based on patterns of bits that have been processed, and when the pattern appears, its pattern is "looked up" in the dictionary and a compressed code substituted for the pattern. Where there is minimal structure in the image, data compression is poor and this affects seriously the amount of data that can be stored. Lempel Ziv schemes typically do not separate and compress individual bit planes.

It is, therefore, an object of the invention to provide a method and apparatus for processing image data that provides for increased compressibility of rendered image data.

SUMMARY OF THE INVENTION

The above and other objects which will become apparent after reading this disclosure are realized by a method of processing image data of pixels to be rendered for efficient storage in a memory or for efficient transmission over a communication pathway wherein a grey level value of a rendered pixel is represented by multiple bits including a most significant bit (MSB) and a least significant bit (LSB), said method comprising the steps of modifying the density values of successive pixels each in accordance with diffusion of errors in rendering of adjacent pixels to form for said pixels modified density values; generating for each of said pixels a multibit digital signal that represents a rendered pixel value by subjecting the modified density value to a thresholding operation wherein the thresholding operation employs position of a pixel to determine the digital value of the LSB of the pixel; and encoding the rendered pixel values to compress image data representing the rendered pixel values.

In accordance with another aspect of the invention, there is provided an apparatus for processing image data of pixels to be rendered for efficient storage in a memory or for efficient transmission over a communication pathway wherein a grey level value of a rendered pixel is represented by multiple bits including a most significant bit (MSB) and a least significant bit (LSB), said apparatus comprising means for modifying the density values of successive pixels each in accordance with diffusion of errors in rendering of adjacent pixels to form for said pixels modified density values; rendering means for generating for each of said pixels a multibit digital signal that represents a rendered pixel value by subjecting the modified density value to a thresholding operation wherein the thresholding operation employs position of a pixel to determine the digital value of the LSB of the pixel; and means for encoding the rendered pixel values to compress image data representing the rendered pixel values.

BRIEF DESCRIPTION OF THE DRAWINGS

In the detailed description of the preferred embodiment of the invention presented below, reference is made to the accompanying drawings in which:

FIG. 2 are tables of data that may be used in a conventional error diffusion image processor for rendering image data;

FIGS. 4A and 4B are tables of dam that are used in one embodiment of an error diffusion image processor for rendering image data in accordance with the invention;

DESCRIPTION OF THE PREFERRED EMBODIMENTS

Because apparatus of the type described herein are in general well known, the present description will be directed in particular to elements forming part of or cooperating more directly with the present invention. Apparatus not specifically shown or described herein are selectable from those known in the prior art.

The invention will fast be described with reference to conventional processing of image data. Thereafter, the description will provide disclosure of modifications to this processing that in accordance with the invention provide for improved compression of rendered image data.

Figure 1A:
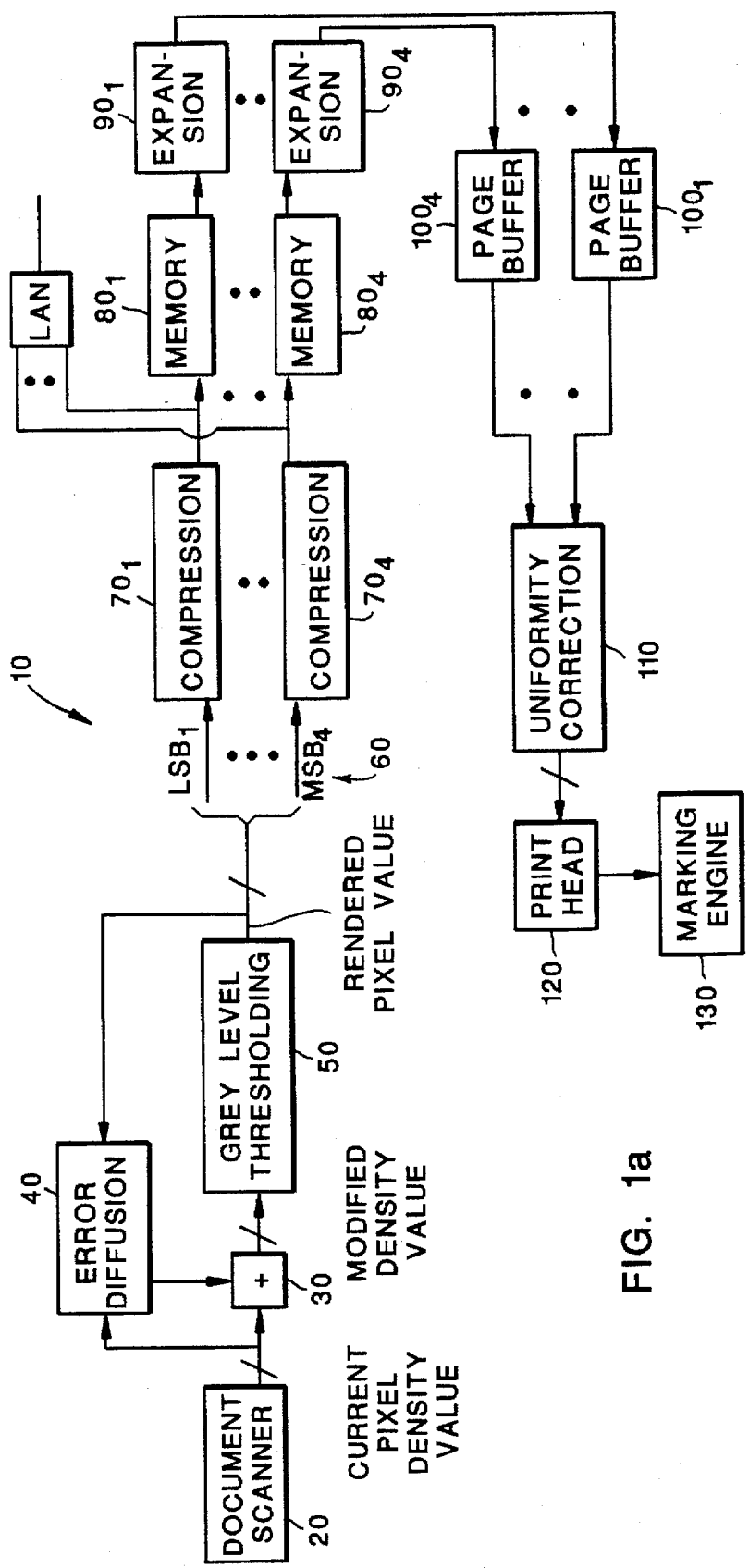
FIGS. 1A and 1B are schematics of document copiers that are modified to include image processing in accordance with first and second embodiments of the invention.

With reference now to FIG. 1A, there is shown a schematic of a recording apparatus that includes a document scanner 20 which scans a document say at 600 dots per inch and outputs for each scanned pixel area an 8-bit signal representing grey level values from 0 to 255 of rasterized image data. Scanners of this type are well known and are provided with suitable electronic circuitry for correcting for background of the document and other factors not associated with the present invention. Since the scanner defines a pixel to be recorded with 8-bits of density data whereas the printer records at say 15 levels of grey that can be defined with 4-bits of data there is a need to render the data; i.e., transform the scanner output data to a form suited for that of the printer. In the rendering process there is typically provided a thresholding operation. For example, and with reference to the table of FIG. 2, 8-bit density values of 0 to 15 maybe rendered as pixel grey value 0; density values 16–31 maybe rendered as pixel grey value 1, etc. Since there is a range of density values for which a rendered value may be assigned, it is convenient to assume that the midpoint of the range is the accurate rendition point and that quantization errors are defined from this midpoint range. Thus, a density value of 16–31 has a midpoint of 24. A density value of 31, when rendered as pixel grey value 1, has an assigned error of +7. Similarly, for density values in the range 32 to 47 and rendered as pixel grey value 2, the quantization error represents the difference between the density value and the midpoint (40) with the appropriate sign. The use of the midpoint density is generally provided for except at the extremes; i.e., density values 0–15 rendered as pixel value 0 are deemed to have error measured from 0 and density values 240–255 and rendered as grey level pixel values 15 are deemed to have error measured from 255. These values from which errors are calculated are listed in the table of FIG. 2 as the error array (column B).

Figure 3:
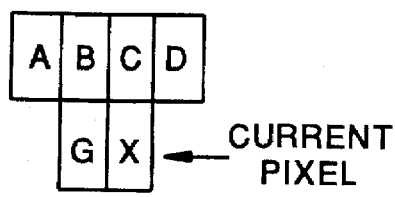
FIG. 3 illustrates a typical error diffusion process.

With reference to FIG. 3, error diffusion is performed by considering the current density value X and generating a modified density value by adding errors occurring in rendering of prior neighboring pixels A, B, C, D and G. Typically, these errors are weighted by multiplying each by a suitable coefficient so that errors in pixels closer to pixel X have more of an affect on adjustments to modify pixel X. The error diffusion kernel illustrated in FIG. 3 is merely exemplary and the invention is not limited to any particular error diffusion kernel or algorithm.

Thus, element 40 shown in the schematic of FIG. 1A includes memory for storing errors of prior rendered pixels in the neighborhood (kernel) of the current pixel X and provides for multiplication of the errors in accordance with a suitable programmed coefficient. The sum of the weighted errors are then added in an adder 30 with the current density value to define an 8-bit modified density value that is subject to thresholding by a grey level thresholder. The current density value is also input to element 40 so that error may be determined in rendering of the current pixel for distribution to subsequent current pixels. In typical grey level error diffusion, the density values having ranges in column A of FIG. 2 are assigned 4-bit rendered pixel values indicated in column C of FIG. 2. The elements 30, 40 and 50 may be realized by a general purpose computer or programmed microcomputer or a programmable logic circuit or dedicated circuit. Details regarding programming of such computer or microcomputers are well known and generally within the skill of the art. In addition, logic performing circuits and their construction are also well known.

In the preferred method and apparatus of FIG. 1A, after thresholding, the 4-bit rendered pixel value is separated into its various bit planes (note, the intermediate bit planes and processing therefor are not specifically shown). The bit planes of the rendered data for the various rendered pixels are separately encoded or compressed using an adaptive compression algorithm by a compression device $70_1$–$70_4$, such as Q-coder or Lempel-Ziv, for example and then stored in compressed form in memories $80_1$–$80_4$. Where the scanner document is part of a multisheet document, plural document sheets may be scanned by scanner 20 so that the memories $80_1$–$80_4$ may be used to provide data for printing collated sets of the multisheet document without having to scan the multisheet document more than once. As is known, the data is read or output from the memories for printing and returned thereto for use in printing of the next set. In outputting data for printing, the compressed data is expanded back to rasterized data by an expansion processor $90_1$–$90_4$ and output to page buffers $100_1$–$100_4$. When the next line of data is to be output to the printhead 120 and assuming an LED (light-emitting diode) printhead is used the data for each pixel may be stitched together and input to a table 110 for uniformity correction. The corrected data can then be used for exposing say an electrostatically charged photoconductive web or drum or other photosensitive element that is part of a marking engine 130 for recording a grey level at each of plural appropriate points of an image recording member to form an image. Details of this marking engine portion of the apparatus are not essential to an understanding of the invention as the invention may be used with various forms of marking engines suited for non-impact printing in general.

As noted above, adaptive compression processes work best when there is underlying structure to the image data. Since error diffusion tends to reduce any structure that may be in the data, the use of adaptive compression processes are deemed not well suited for error diffused data. In accordance with the invention, we have recognized that in an error diffusion process, structure may be forceably imparted to the thresholded image data so that relatively high compression ratios may be obtained by adaptive compression processes. The description of how this forcing of the data is provided will now be described in conjunction with FIGS. 1 and FIGS. 4A, 4B, 5 and 6, it being assumed that the apparatus of FIG. 1 is now modified and programmed to operate in accordance with the disclosure provided below.

Figure 5:
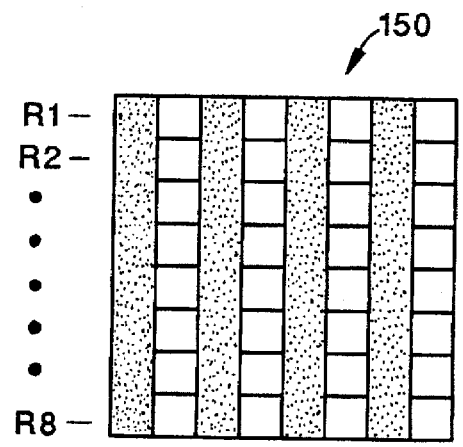
FIG. 5 illustrates a pattern of LSBs of rendered image data in accordance with the tables of FIGS. 4A and 4B.
Figure 6A:
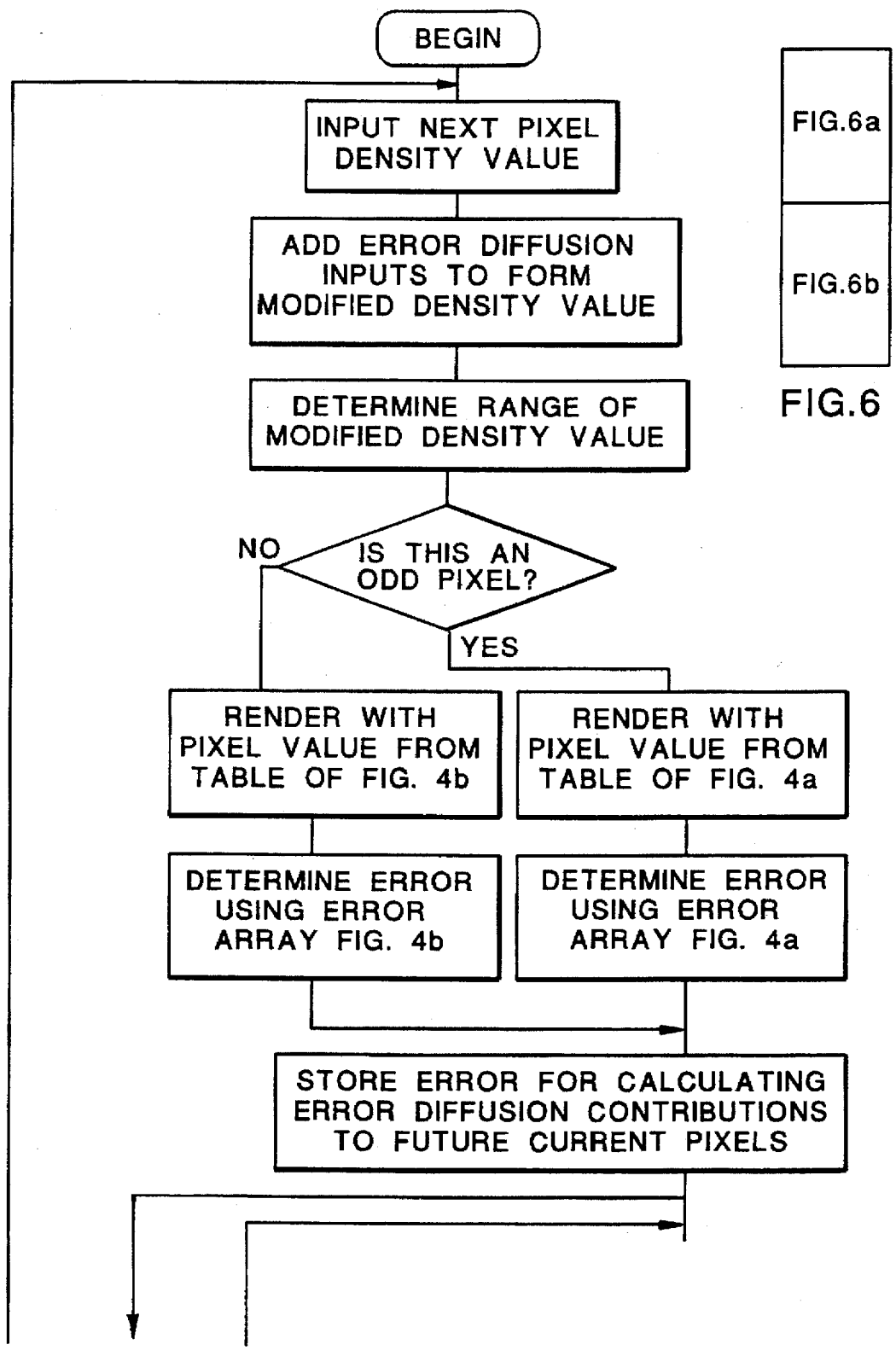
FIG. 6 is a flowchart of a rendering process associated with the rendering pattern of FIG. 5.
Figure 6B:
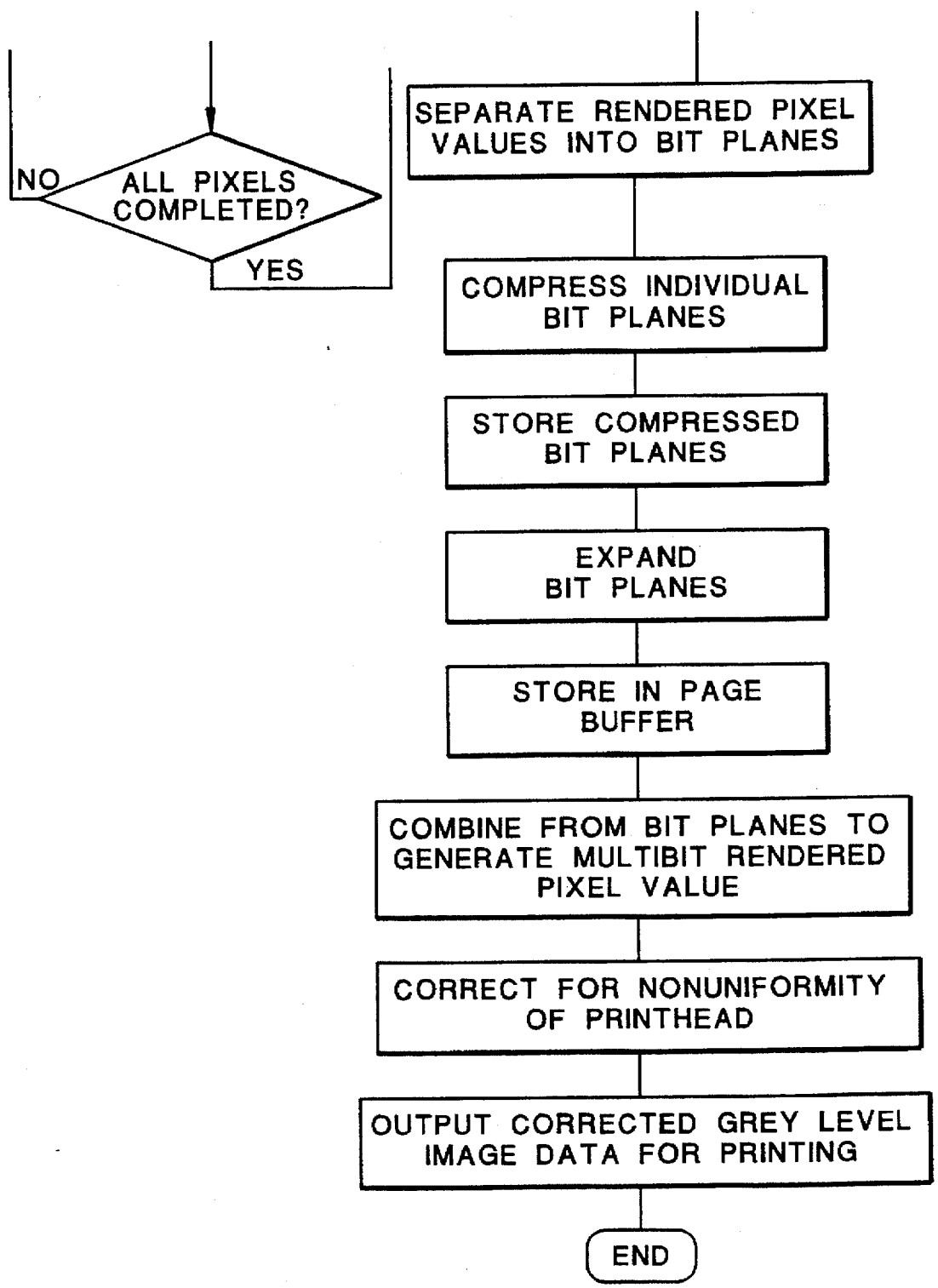

With reference to FIG. 5, there is illustrated a pattern 150 of odd (dark) and even (light) pixels in each pixel row from left to right. In this sketch, eight rows, R1–R8, of pixels are illustrated. In each row an odd pixel will be rendered in accordance with the table of FIG. 4A. Note that as before the density of a pixel to be rendered may be any value from 0–255. This holds true even after error diffusion. However, note that rendered pixel values for the odd pixels in the row have the same LSB value (except for rendered pixel value 0) of digital "1". In FIGS. 4A and 4B, digital values corresponding to the rendered pixel values are also indicated in binary coded form. Similarly, as may be noted in FIG. 4B, all rendered even pixels in each row are rendered so that the rendered pixel value for each pixel is such that the LSBs are all digital "0" (except for rendered pixel value 15). Thus, it is apparent that thresholder 50 is programmed to provide selective different thresholding to odd and even pixels so that the LSBs are provided with an induced structure. An adaptive compression program will advantageously run efficiently to compress this data, and in particular, improvement will be noted in compressing the LSBs after error diffusion. The flowchart of FIG. 6 illustrates steps in the operation of the process of the invention which is repeated for each pixel although in practical operation steps for rendering the entire multipage document may be performed before outputting any rendered image data to the printer for printing see in this regard the disclosure of U.S. Pat. No. 5,384,646, the contents of which are incorporated herein by reference.

Figure 7:
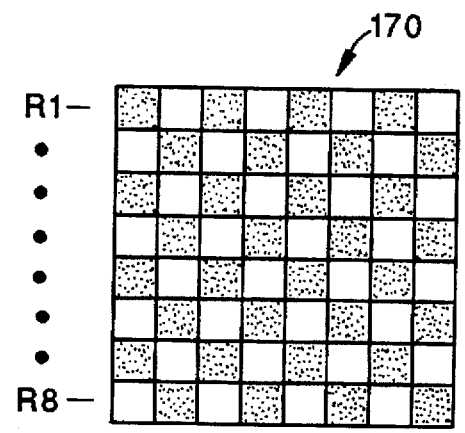
FIG. 7 illustrates a pattern of LSBs of rendered image data also in accordance with the tables of FIGS. 4A and 4B but in another embodiment of the invention.
Figure 8A:
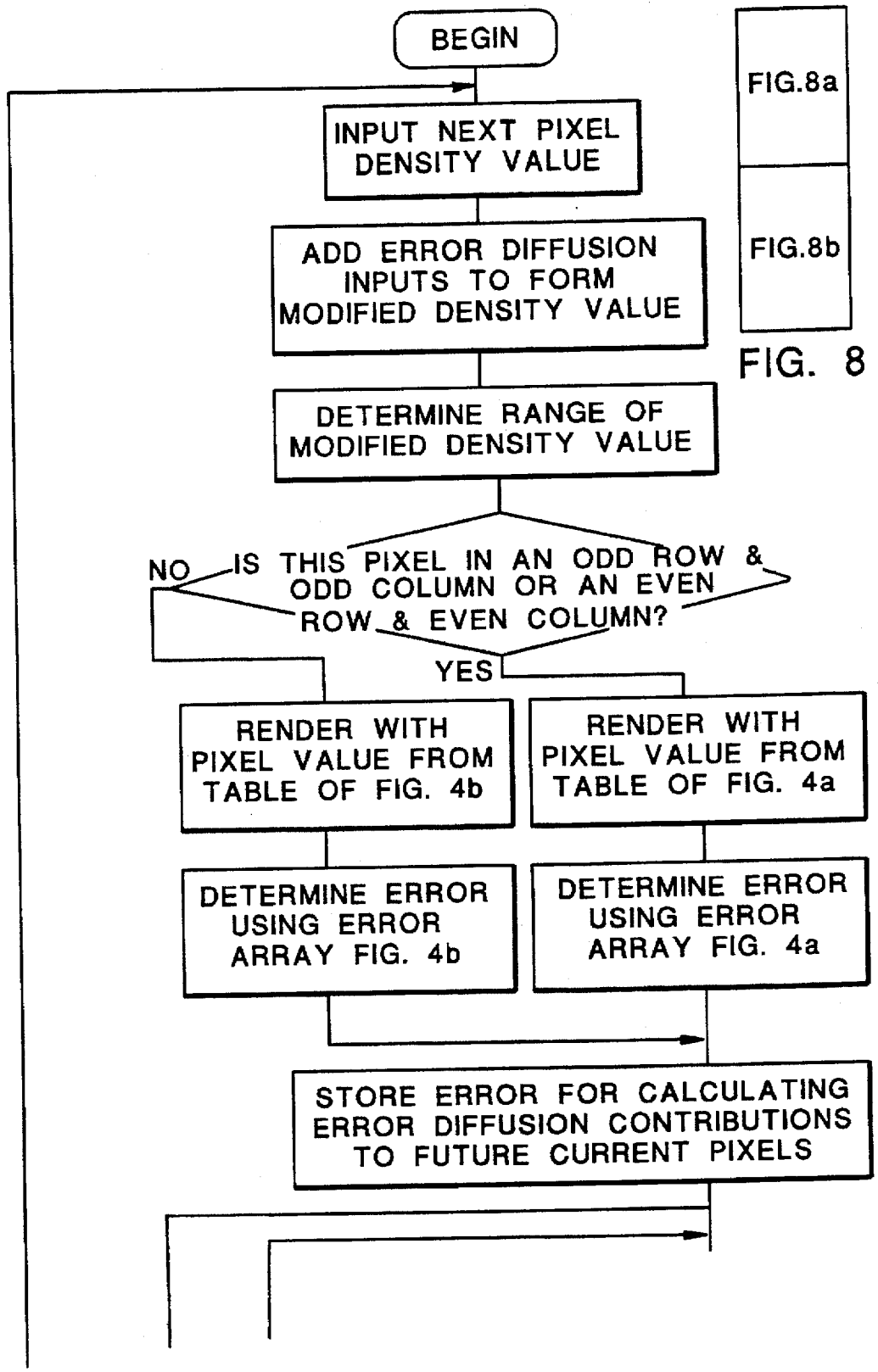
FIG. 8 illustrates a flowchart of a rendering process associated with the rendering pattern of FIG. 7.
Figure 8B:
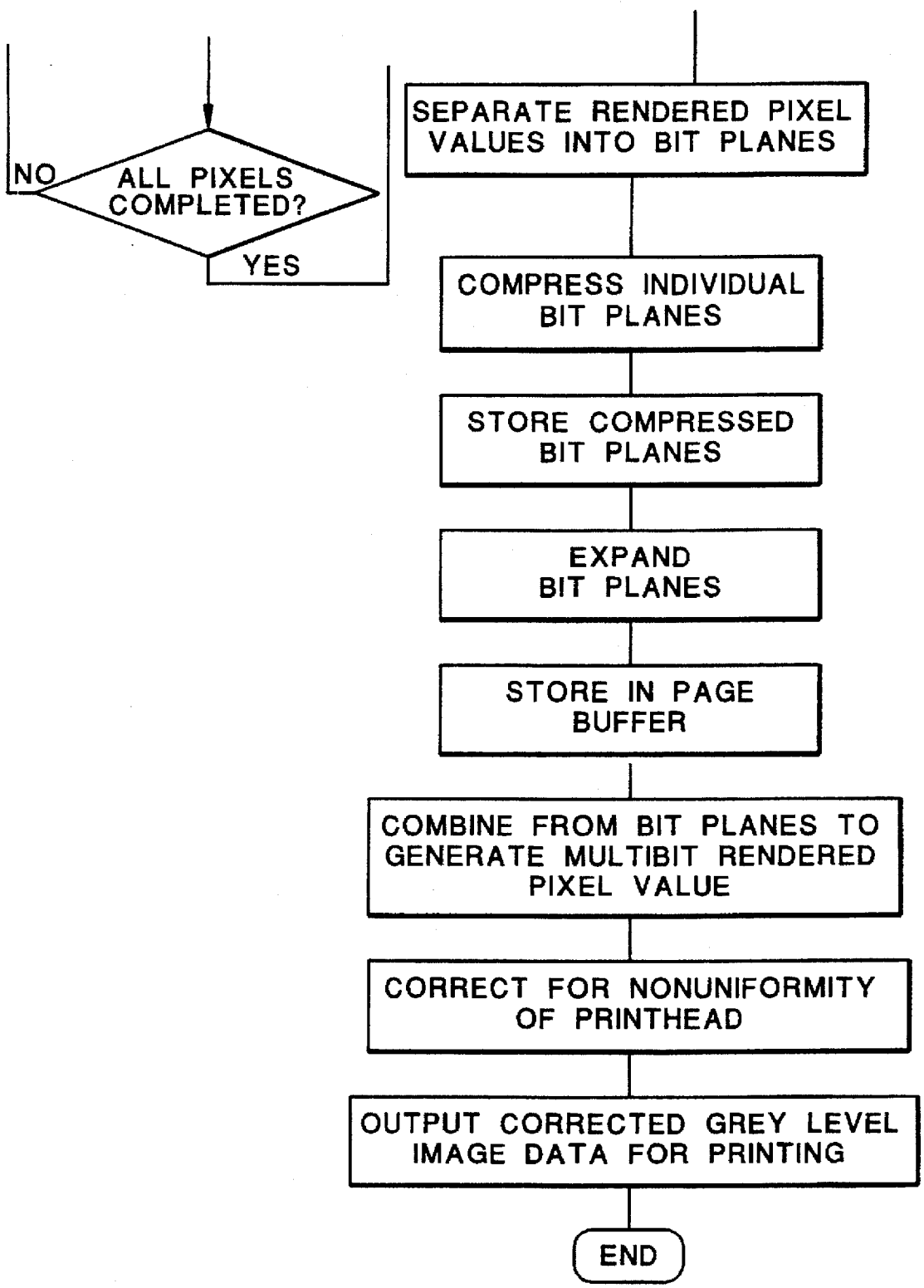

With reference now to FIGS. 7 and 8, there is shown a further example of forcing the rendered image data to have structure suited for compression. In FIG. 7, a checkerboard pattern of structure 170 is imparted to the LSB bit plane of rendered pixel values. The tables in FIGS. 4A and 4B are also suitable for accomplishing this and FIG. 8 is an illustrative flowchart of the process. To generate a checkerboard pattern, consideration is given to row as well as pixel position (column) in the row. Thus, pixels in odd rows and odd columns and pixels in even rows and even columns tend to be formed with the LSBs as digital "1s" whereas all other pixels tend to be formed with digital "0s".

With this invention, the possible pixel values which a pixel can take is dependent on pixel position. In this way, the pixel levels can be selected such that the LSB can occur to match some specific pattern. The appropriate assignment of threshold and error arrays allows the algorithm to automatically track the correct gray level (i.e., it still works properly or it is mean preserving because of the feedback nature of an error diffusion algorithm). This pixel pattern can then in turn be learned by the arithmetic coding algorithm or any compression algorithm which is capable of improving compression by learning patterns. For an arithmetic coder, this is accomplished by selection of an appropriate context. One such pattern, as has been shown, is alternating pixel positions Another such pattern is a checkerboard. However, these patterns are only preferred examples.

The specific pattern to be used can be optimized to meet the limitations and requirements of the marking engine or the specific adaptive learning properties of the compression algorithm or both. Preserving the LSB plane of a multibit image preserves the higher image quality attainable with multibit images. Improving the compressibility of the LSB allows the system to preserve the high image quality while at the same time improving the compressibility of the image. Where four or more bit planes are used, the two lowest significant bit planes may be forced to attain structure in accordance with the teachings herein.

The invention is not just limited to forcing structure upon LSB planes alone but could include other bit planes, too. For example, if the LSB plane and the bit plane next to the LSB plane are desired to be forced into a pattern of bits, there would be 4 possible tables of pixel levels and each table would have about half again as many values as the example just provided above. A pixel could only be assigned a new pixel value after thresholding that is in a particular one of these 4 tables. The next pixel would receive assignments from a particular second one of these tables. Thus, there would be order to the bits in the two least significant bit planes.

The invention has thus shown that there is an interrelationship between rendering and compressing within the imaging chain. The basic concept of the invention suggests that a rendering algorithm operating on error diffused image data be modified in such a way as to improve the compressibility of the LSB planes in order to significantly improve the compressibility of the total image data by imparting structure where the error diffusion process would normally remove such structure.

By forcing structure into the LSB plane(s) patterns for LSBs of incoming new pixel values to the compressor are highly predictable. Because there are compression algorithms that are adaptable or programmable to recognize patterns in data and employ relatively high compression ratios to bit patterns that are recognizable a relatively high compression can be expected of this data.

The reason that error diffusion is of importance here is that by forcing more errors into the rendering process; i.e., in creating new pixel values from limited ranges of values; the error diffusion process can make up for these errors so that appearance of the image is only minimally affected but compressibility is significantly improved.

Although the image data described herein is provided by a document scanner the invention contemplates that such data may be generated from a computer, and/or word processor, facsimile or generally a source of electronic or digitized information. In addition rendered data in accordance with the invention may be output to other recording devices, in addition to printers, such as displays or output to storage devices serving as electronic memories. In addition while the schematic of FIG. 1A illustrates separate compression devices for compressing separate bit planes the invention contemplates that a single compression device may be provided for serially operating on the rendered pixel data of separate bit planes and storing this data efficiently in a single memory or providing for efficient transmission of the data over telephone lines, networks such as LANs, and other communication pathways.

Figure 1B:
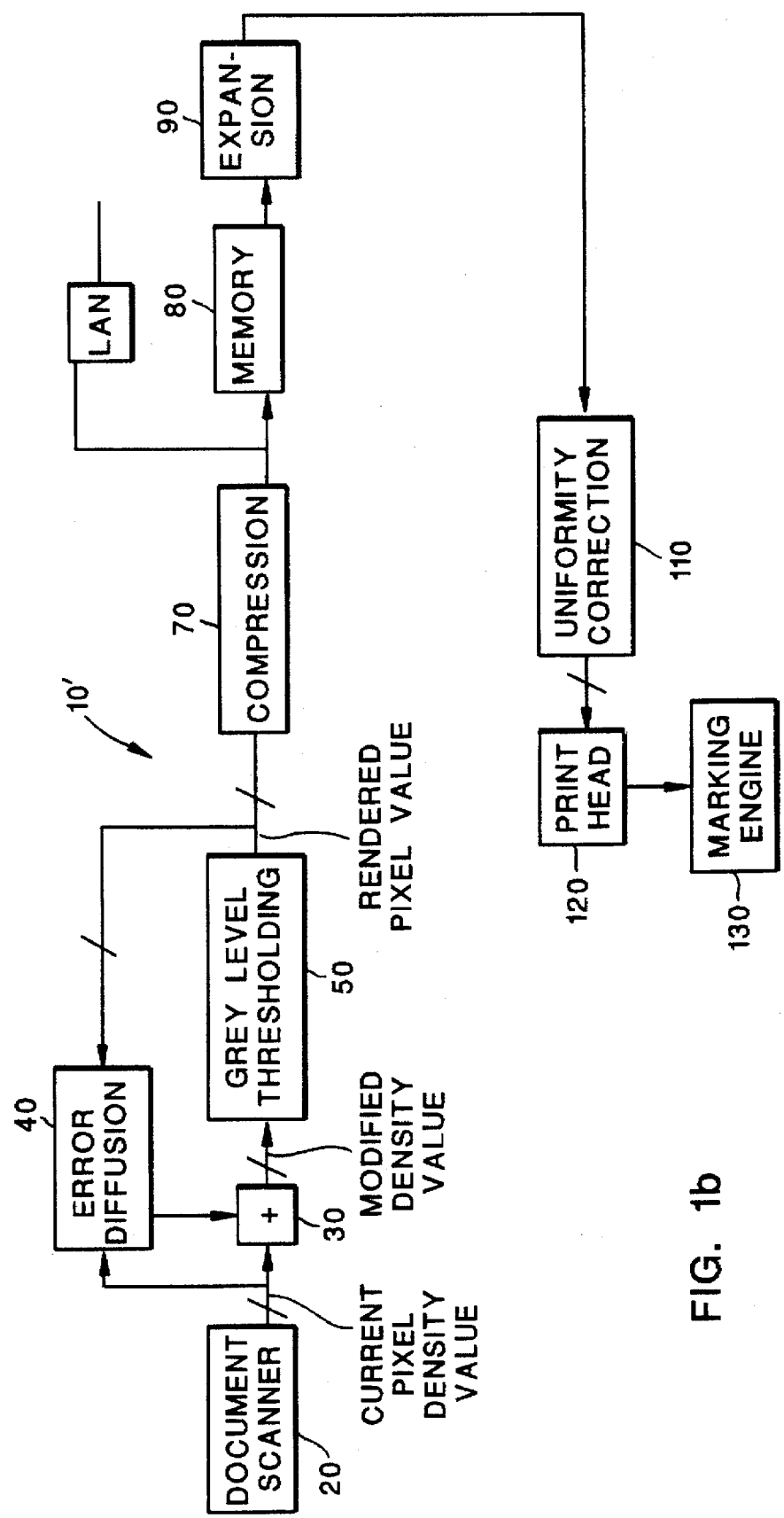

In accordance with a second embodiment of the invention, an apparatus 10' is illustrated in FIG. 1B wherein similar parts to that shown in FIG. 1A are identified with similar reference numbers. In apparatus 10', a compression device 70 does not operate on separate bit planes. The compressed data is stored in a memory 80 and expanded by expansion processor 90. The expansion processor outputs the data for storage in a page buffer 100 for printing as discussed above, or alternatively, the compressed data may be output to a LAN or other communication pathway for efficient transmission. In the embodiment of FIG. 1B, rendered pixel data has structure imposed at least upon the LSB's of the data in accordance with the description provided above. However, in this embodiment, complete grey level data for plural pixels are packed together to form a symbol prior to input to the compressor 70. Thus, a symbol may be formed from packing together as a symbol byte rendered image data of, for example, two pixels at 4-bits per pixel for input to the compressor device 70. Because the LSB's of the rendered data have structure imposed thereto, the compressibility of the rendered image data is enhanced.

The invention has been described in detail with particular reference to preferred embodiments thereof, but it will be understood that variations and modifications can be effected within its spirit and scope of the invention.

What is claimed is:

1. A method of processing image data of pixels to be rendered for efficient storage in a memory or for efficient transmission over a communication pathway wherein a grey level value of a rendered pixel is represented by multiple bits including a most significant bit (MSB) and a least significant bit (LSB), said method comprising the steps of:

modifying the density values of successive pixels each in accordance with diffusion of errors in rendering of adjacent pixels to form for said pixels modified density values;

generating for each of said pixels a multibit digital signal that represents a rendered pixel value by subjecting the modified density value to a thresholding operation wherein the thresholding operation employs position of a pixel to determine the digital value of the LSB of the pixel; and encoding the rendered pixel values to compress image data representing the rendered pixel values.

2. The method of claim 1 and wherein the thresholding operation employs position of a pixel to determine the digital values of the LSB and the bit next to the LSB of the pixel.

3. The method of claim 1 and wherein the rendered image values for successive pixels are divided into bit planes.

4. The method of claim 1 and wherein the thresholding operation provides an LSB plane with a checkerboard pattern of digital 1's and 0's.

5. The method of claim 1 and wherein the thresholding operation provides an LSB plane with an alternating pattern of digital 1's and 0's.

6. The method of claim 1 and wherein the encoding operates on symbols representing multibit pixel data from plural pixels.

7. The method of claim 1 and including the step of storing the compressed image data in a memory.

8. The method of claim 1 and including the steps of transmitting the compressed image data over a communication pathway.

9. An apparatus for processing image data of pixels to be rendered for efficient storage in a memory or for efficient transmission over a communication pathway wherein a grey level value of a rendered pixel is represented by multiple bits including a most significant bit (MSB) and a least significant bit (LSB), said apparatus comprising:

means for modifying the density values of successive pixels each in accordance with diffusion of errors in rendering of adjacent pixels to form for said pixels modified density values;

rendering means for generating for each of said pixels a multibit digital signal that represents a rendered pixel value by subjecting the modified density value to a thresholding operation wherein the thresholding operation employs position of a pixel to determine the digital value of the LSB of the pixel; and means for encoding the rendered pixel values to compress image data representing the rendered pixel values.

10. The apparatus of claim 9 and including means for dividing rendered image data for successive pixels into bit planes.

11. The apparatus of claim 9 and wherein the rendering means provides an LSB plane with a checkerboard pattern of digital 1's and 0's.

12. The apparatus of claim 9 and wherein the rendering means provides an LSB plane with an alternating pattern of digital 1's and 0's.

13. The apparatus of claim 9 and wherein the means for encoding operates on symbols representing multibit pixel data from plural pixels.

14. The apparatus of claim 9 and including a memory for storing the compressed image data.

15. The apparatus of claim 9 and including a communication pathway for transmitting the compressed image data.

* * * * *